C. C. WILKINSON.
WIRE WINDING DEVICE.
APPLICATION FILED MAY 13, 1911.

1,024,384.

Patented Apr. 23, 1912.

Witnesses:
Christ Feinle, Jr.
U. D. Willyard

Inventor,
Charles C. Wilkinson.
By Victor J. Evans,
Attorney.

UNITED STATES PATENT OFFICE.

CHARLES C. WILKINSON, OF COLEMAN, TEXAS.

WIRE-WINDING DEVICE.

1,024,384. Specification of Letters Patent. Patented Apr. 23, 1912.

Application filed May 13, 1911. Serial No. 626,882.

*To all whom it may concern:*

Be it known that I, CHARLES C. WILKINSON, a citizen of the United States, residing at Coleman, in the county of Coleman and State of Texas, have invented new and useful Improvements in Wire-Winding Devices, of which the following is a specification.

The present invention provides an appliance by the use of which wooden bars or timbers may be strengthened, or in the event of said bars being split, they may be repaired by wrapping wire about the same.

This invention supplies a frame in which is mounted a spool the latter having wire wound thereon, said frame being used as convenient means for passing the wire from the spool around the timber, beam, or bar to be strengthened. A tension device is mounted upon the frame to retard the rotation of the spool, thereby enabling the wire to be wound around the timber with any degree of tension.

A further purpose of the invention is the provision of a device which will enable the spool to be replenished after the wire has been used therefrom, the frame being adapted to be held in any convenient position, while the spool is rotated to wind the new supply of wire thereon.

The invention further provides a device embodying a frame of novel and peculiar formation and having the side members of the frame connected by bolts or like means which also form supports for the spool, the guide rollers and the tension means.

While the accompanying drawings show the preferred embodiment of the invention it is to be understood that changes within the scope of the invention may be made in the adapting of the structure to meet special requirements without departing from the nature of the invention.

Figure 1:
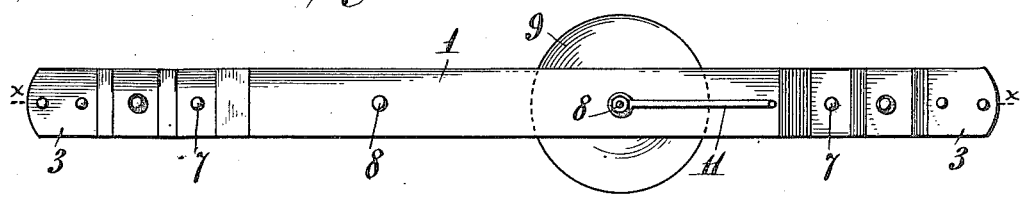
Figure 2:
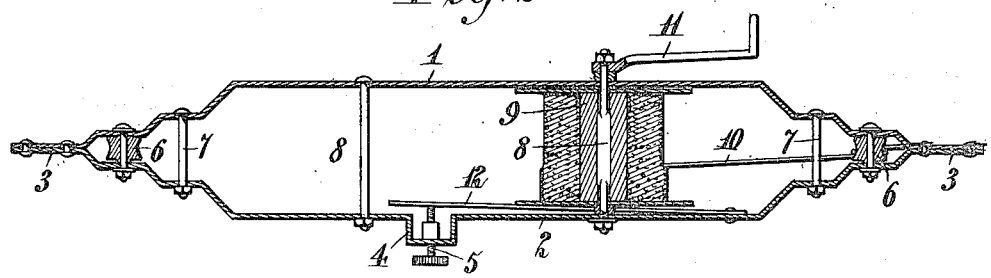

Referring to the drawings forming a part of the specification:—Figure 1 is a top plan view of an appliance showing the preferred form thereof. Fig. 2 is a longitudinal section on the line x—x of Fig. 1.

The frame of the appliance comprises longitudinal bars 1 and 2, the same being spaced apart and having their end portions brought together and connected in any manner to form handles 3. One of the longitudinal bars has a portion offset as indicated at 4 which is fitted with a set screw 5 for a purpose presently to be explained. Guide rollers 6 are located near each end of the frame and are mounted upon bolts or rods which are supported at their ends in the longitudinal bars and serve to connect the same. The grooved rollers 6 receive the wire provided to be wrapped about the beam, bar or like part to be strengthened or repaired. Other rods 7 connect the longitudinal bars a short distance from the rods supporting the guide rollers 6 and these rods give direction to the wire. Rods 8 are supported in the longitudinal bars 2 so as to have a rotary movement imparted thereto. A spool 9 is adapted to be mounted upon one of the rods 8 and has wire 10 wound thereon. The spool 9 is mounted to turn with the rod 8 upon which it is mounted. A crank 11 is adapted to be fitted to the spool supporting rod 8 to turn therewith for rotating the spool to wind the wire 10 thereon.

To the successful operation of the device it is necessary to retard the spool 9 in its rotation in order that the proper tension may be applied to the wire 10 and for this purpose a tension means is had the same consisting of a flat spring 12 which is secured at one end to a side bar of the frame and has its opposite end arranged to be engaged by the set screw 5, said spring extending along one head of the spool to engage frictionally therewith. By turning the set screw 5 to a greater or less extent, the spring 12 may be caused to bear against the head of the spool with a greater or less pressure offering more or less resistance to the rotation of the spool when the wire is unwound therefrom and wound about the beam or bar or like timber to be straightened. It is to be understood that a spool may be mounted upon either one or both of the rods 8 so that when the wire is used from one spool a fresh supply of wire may be drawn from the other spool.

In the operation of the invention wire is wound upon the spool 9 by rotating the same through the instrumentality of the crank 11 and after the spool has been filled the outer portion of the wire is passed beneath the rod 7 thence over the grooved roller 6. The end of the wire is secured in any manner to the timber to be strengthened after which the frame is moved around the bar or other work thereby wrapping the wire about the same, the wire being drawn from the spool 9 as it is wrapped about the work, the tension of the wire being regulated by the resistance offered to the rotation of the spool 9.

Having thus described my invention, what is claimed as new is:—

1. An appliance for wrapping wire about a bar or like part to be strengthened, the same comprising a frame embodying spaced longitudinal bars having their end portions inwardly stepped and their extremities brought together and secured to form handles, rods connecting the stepped portions of the bars, guide rollers mounted upon the outer rods, the inner rods forming guides, other rods connecting the longitudinal bars intermediate of their stepped end portions, a spool mounted upon one of the last mentioned rods, and a tension device for engaging the spool to offer a greater or less resistance to the rotation thereof.

2. An appliance of the character described for wrapping wire about a bar or like part to be strengthened the same comprising a frame having extensions at opposite ends forming handles, guide rollers at opposite ends of the frame, a spool mounted upon the frame and adapted to have wire wound thereon, a guide rod mounted upon the frame, and a tension device adapted to engage an end portion of the spool with a greater or less pressure.

In testimony whereof I affix my signature in presence of two witnesses.

CHARLES C. WILKINSON.

Witnesses:
C. G. PITTS,
J. C. SMITH.